United States Patent [19]
Harpman et al.

[11] 4,050,419
[45] Sept. 27, 1977

[54] HOT FUEL GAS GENERATOR

[75] Inventors: Webster B. Harpman, Poland, Ohio; Fred G. Mahoney, Pittsburgh, Pa.

[73] Assignee: Econo Fuel Systems, Inc., Latrobe, Pa.

[21] Appl. No.: 625,565

[22] Filed: Oct. 24, 1975

[51] Int. Cl.$^2$ .................................... F02B 43/00
[52] U.S. Cl. .................... 123/3; 123/25 B; 123/25 D; 123/122 F; 123/133; 48/102 A; 48/102 A; 48/103; 48/180 H; 261/18 A; 261/142; 261/145
[58] Field of Search ............... 261/18 A, 142, 145; 123/1 A, 3, 25 B, 25 D, 122 E, 122 F, 133; 48/102 R, 102 A, 103, 105, 106, 94, 95, 180 H, 180 P, 214 R, DIG. 8

[56] References Cited

U.S. PATENT DOCUMENTS

| | | | |
|---|---|---|---|
| 1,110,482 | 9/1914 | Collier | 123/122 F |
| 1,127,709 | 2/1915 | Wolfe | 48/95 |
| 2,272,341 | 2/1942 | Holzapfel | 48/106 |
| 2,285,905 | 6/1942 | Cunningham et al. | 48/107 |
| 2,585,171 | 2/1952 | Pyle | 123/133 |
| 2,892,692 | 6/1959 | Anderson | 261/145 |
| 3,915,669 | 10/1975 | Minoza | 48/180 H |

FOREIGN PATENT DOCUMENTS 1,010,603  3/1952  France .................. 123/25

Primary Examiner—S. Leon Bashore
Assistant Examiner—Peter F. Kratz
Attorney, Agent, or Firm—Webster B. Harpman

[57] ABSTRACT

A hot fuel gas generator for an internal combustion engine vaporizes gasoline and water in a heated pressure vessel and mixes the resulting superheated gaseous fuel with air in a metering valve which communicates with the internal combustion engine. A single device operating at a very high temperature, for example 1000° F., is used for the simultaneous vaporization of the fuel and water to develop desirable working pressure and volume. The high temperature gaseous state of the fuel represents molecules at the greatest degree of separation from each other providing the greatest opportunity for contact of the reacting species in the gaseous condition as chemical reactions occur only between particles at the atomic or molecular level and it is necessary for the reacting species to be in actual contact at the time of reaction. The fuel gas produced therefore enables complete combustion and the elimination of the atmospheric pollutants common in the operation of internal combustion engines.

2 Claims, 3 Drawing Figures

HOT FUEL GAS GENERATOR

BACKGROUND OF THE INVENTION

1. Field of the Invention

This invention relates to fuel systems and vaporizing devices therein for internal combustion engines, and more particularly fuel gas generators.

2. Description of the Prior Art

Fuel systems for internal combustion engines have generally used carburetors in which gasoline is sprayed into a stream of air and divided into a series of fine droplets approaching vaporization and conveyed to the point of combustion. Only those molecules at the surface of the gasoline droplets are in a position to react with another species and incomplete combustion results because the very short time allowed is insufficient for more than a little vaporization of the fuel to occur. The prior art engines therefore exhaust large quantities of unburned hydrocarbons, carbon monixide and oxides of nitrogen all of which are undesirable atmospheric pollutants.

This invention simultaneously vaporizes the liquid fuel and water at very high temperatures so that the fuel mixture in its heated pressurized gaseous state achieves practically complete combustion in the internal combustion engine due to the spacing of the molecules resulting from heat.

SUMMARY OF THE INVENTION

A fuel system having a novel high temperature pressure controlled heated vaporizer is disclosed in which gasoline and water are simultaneously vaporized to produce a gaseous fuel under pressure for delivery to a metering valve in communication with the inlet manifold of the engine. The metering valve adds the combustion air and regulates the same and the gaseous fuel. The partial vacuum resulting from the operation of the internal combustion engine moves the combustion air with the proper quantity of gaseous fuel from the metering valve to the areas of combustion in the engine. The complete vaporization of the liquid fuel and the water is caused by high temperature heat from an external source under controlled pressure and volume conditions.

DESCRIPTION OF THE PREFERRED EMBODIMENT

Figure 2:
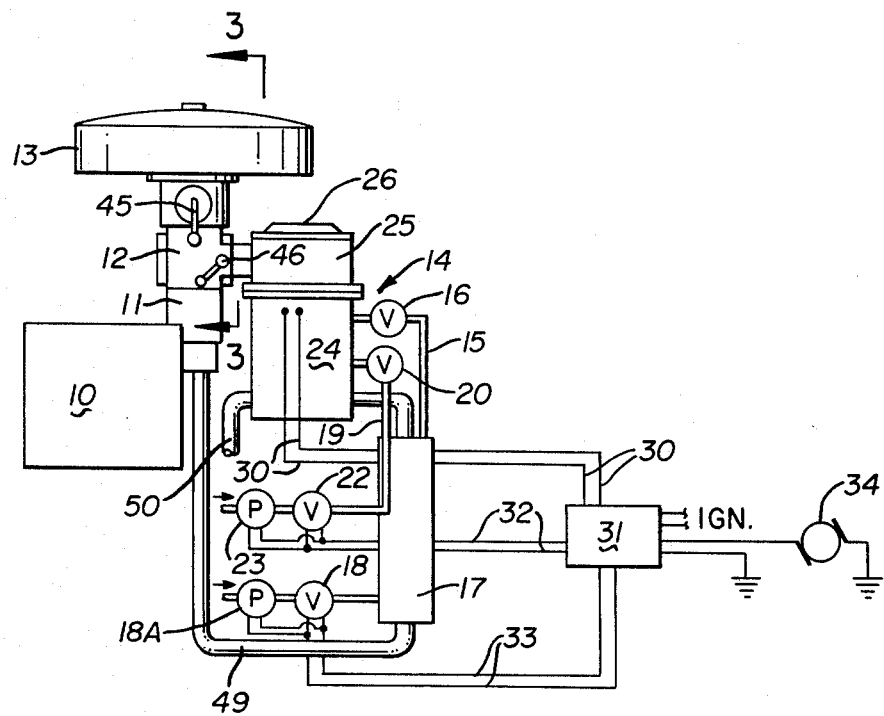
FIG. 2 is a diagrammatic illustration of a fuel system for an internal combustion engine and incorporating the vaporizer of FIG. 1.

By referring to the drawings and FIG. 2 thereof, the form of the invention chosen for illustration and description herein may be seen. A fuel system for an internal combustion engine is illustrated in operative communication with an internal combustion engine 10 of the piston type in which the inlet manifold is indicated at 11 in communication with a metering valve 12 to which primary air is available as from an air cleaner 13. Vaporized fuel consisting of gasoline and water in superheated gaseous form is delivered to the metering valve 12 from a vaporizer 14. Water is supplied to the vaporizer 14 by way of a water line 15 having an adjustable valve 16 therein which communicates with a preheater 17 and a water supply source by way of a solenoid valve 18 and a pump 18A. Gasoline is supplied to the vaporizer 14 by a fuel line 19 having an adjustable valve 20 therein. Substantially eight parts of gasoline to two parts of water are satisfactory. The fuel line 19 communicates with a fuel source by way of a solenoid valve 22 and a pump 23.

Figure 1:
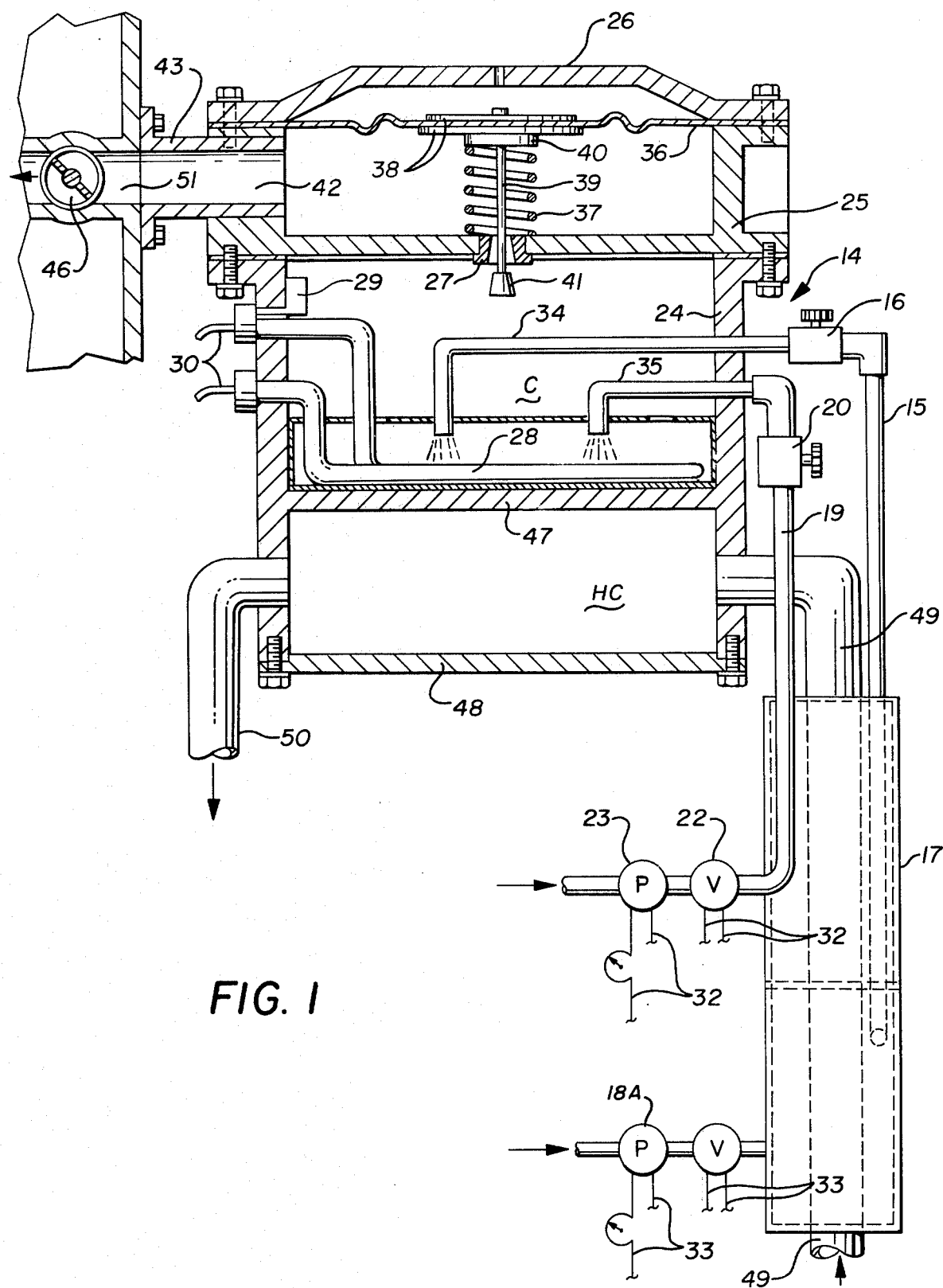
FIG. 1 is a cross sectional elevation of a liquid fuel vaporizer.

By referring now to FIG. 1 of the drawings, it will be seen that the vaporizer 14 consists of a hollow body 24 having a closure formed of a secondary hollow body 25 which in turn is closed by a cap 26. A port 27 in the secondary hollow body 25 communicates with the hollow body 24 and a heated vaporizing chamber C therein. An apertured partition divides the chamber C.

The hollow body 24 which forms the vaporizing chamber C has an electric resistance heating element 28 therein controlled by a temperature and a pressure actuated device 29 which acts to connect the heating element 28 with a power source by way of conductors 30. The conductors 30 extend to a control panel 31, see FIG. 2 of the drawings, and additional conductors 32 and 33 extend from the control panel 31 to the solenoid valves 18 and 22 respectively with the conductors 32 extending to the pump 23 and the conductors 33 extend to the pump 18A. A source of electrical energy, such as an alternator 34, is also connected with the control panel 31 and the arrangement is such that an interconnection with the ignition system of the engine on which the fuel system is installed actuates the control panel 31 and energizes the solenoid valves 18 and 22 respectively along with the pumps 23 and 18A simultaneously energizes the heating element 28 in the vaporizing chamber C. During the subsequent operation of the system the temperature and pressure actuated device 29 acts to control the delivery of gasoline and water to the vaporizing chamber C and maintain desirable heat and pressure conditions therein. The heating element 28 operating at 1250 watts, or more depending upon the output of the alternator 34, supplies sufficient heat to completely gasify gasoline and water vapors delivered into the chamber C by nozzles 34 and 35, from the preheater 17. It has been determined that it is necessary to operate the heating element 28 at temperatures above 600° F. and ranging up to 1800° F. in order to obtain complete gasification of the water and gasoline vapors in the fuel gas generator.

The water and gasoline are supplied the generator by variable output pumps 23 and 18A respectively at pressures between 2 and 12 pounds per square inch, which pressures are substantially increased along with the volume by the superheated gasification of the gasoline and water vapors in the chamber C. The formation of the superheated expanding steam from the water vapor introduced into the vaporizer contributes significantly to the pressure and volume requirements. The superheated rapidly expanding gas from the gasoline vapor mixes with the superheated steam and it is believed that the pressure and temperature environment, both in the vaporizer and the internal combustion engine convert at least some of the water to hydrogen and oxygen to form an additional combustible fuel and at the same time avoid detonation of the fuel and its audible knocking.

Still referring to FIG. 1 of the drawings, it will be seen that the secondary hollow body member 25 with which the port 27 communicates, positions a diaphragm 36 therein for movement by pressures therein. The diaphragm 36 is adjustably spring biased by a spring 37. The diaphragm 36 has discs 38 centrally thereof with a boss 40 thereon and moves responsive to pressures in the secondary hollow body 25 and moves an arm 39 on the boss 40 and a valve element 41 thereon toward and away from the port 27. It will be observed that the common wall forming the bottom of the hollow body member 25 and the top of the vaporization chamber C results in operating temperatures within the hollow body member 25 sufficiently great to maintain the superheated gaseous fuel in its desired state and that the regulator formed by the diaphragm 36, arm 39 and valve element 41 act to maintain a desirable operating pressure, such as for example twelve pounds per square inch, in the hollow body member 25 when negative pressure exists in the outlet thereof. The hot gaseous fuel flows out of the hollow body member 25 through a passageway 42 as defined by a tube 43 and directly into the metering valve 12, which in turn communicates with the inlet manifold 11 of the engine 10.

Figure 3:
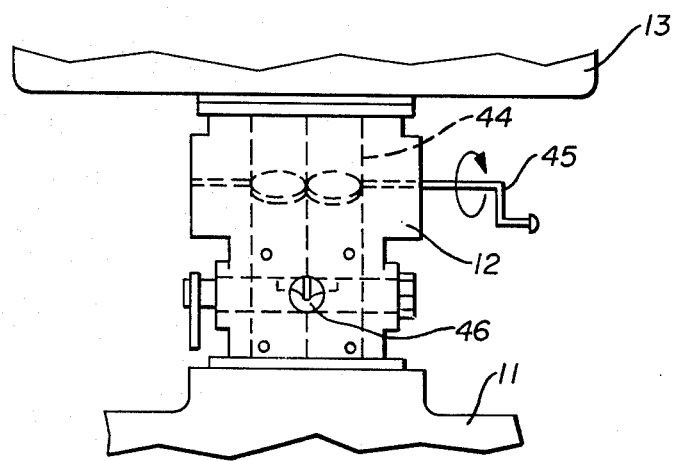
FIG. 3 is an enlarged detal view of a portion of the fuel system.

Those skilled in the art will observe that the metering valve 12 which may be seen in FIG. 3 of the drawings, provides vertical passageways 44 between the air cleaner 13 and the inlet manifold 11 and incorporates a butterfly valve assembly 45 in the air passageways and a rotary valve element 46 in the metering valve controls the communication of the hot gaseous fuel being delivered thereto from the vaporizer 14 as hereinbefore described. The rotary valve 46 and the butterfly valve 45 are interconnected so that throttle control of the internal combustion engine actuates the valves 45 and 46 to deliver predetermined desirable amounts of combustion air and hot gaseous fuel directly to the intake manifold 11 of the internal combustion engine. It will be observed by those skilled in the art that it is essential that the high operating temperature of the device be maintained and to this end suitable insulation is installed to prevent cooling of the hot gaseous fuel and to further increase the efficiency of the device. The vaporizer 14 has a false bottom 47 spaced above a bottom cap 48 so as to form a heating chamber HC immediately below the vaporizing chamber C. Exhaust gases from the exhaust manifold of the engine pass by way of an exhaust pipe 49 through the preheater 17 and into this heating chamber HC and emerge therefrom through a secondary exhaust pipe 50 which communicates with the exhaust system as will be understood by those skilled in the art.

As a result of this supplemental heating from engine exhaust the vaporization chamber C is more readily maintained at its 1800° F. operating temperature and the energy demand on the electric heating element 28 is reduced. The same exhaust heat produces gasoline and water vapors in the preheaters 17 and 21.

Those skilled in the art will observe that a desirable ratio between the gasoline and the water delivered to the vaporizer 14 in the fuel system disclosed herein is necessary and desirable and it has been determined that considerable leeway with respect to the amount of water introduced into the fuel mixture is possible. An internal combustion engine operating on the fuel system disclosed herewith operates at peak efficiency only when water is added to the vaporator and when the water comprieses 5 to 25% of the total liquid delivered to the vaporizer. Successful operation can be maintained with percentages of the water as high as 30% of the total liquid. Amounts below 2% adversely affect the operation as a reduction in rpm and torque ability is quite noticeable.

It will occur to those skilled in the art that an antifreeze additive such as alcohol can be added to the water supplied the fuel system herein without affecting the operation of the same and without changing the water to gasoline ratio.

The metering valve 12 may comprise any suitable commercial device which will control the amount of air and a gaseous fuel admitted thereto for delivery to the inlet manifold 11 and one such suitable metering valve is generally available under the trademark CENTURY. In the preferred embodiment, as seen in FIGS. 2 and 3 of the drawings, the metering valve 12 provides throttle control with respect to the amount of air and hot gaseous fuel admitted to the inlet manifold 11 of the internal combustion engine, responsive to the partial vacuum in the inlet manifold 11 as will be understood by those skilled in the art.

The metering valve 12 hereinbefore referred to is partially illustrated in FIGS. 1, 2 and 3 of the drawings, and in FIG. 1 of the drawings it will be seen that the vaporizer which has been generally indicated by the number 14 is mounted on the side of the metering valve 12 so that the hot gaseous fuel passageway therefrom communicates with a passageway 51 in the metering valve 12 and directly with the rotary valve 46 therein which is disposed transversely thereto.

Those skilled in the art will be aware that decomposition of a fuel molecule may occur without combustion occuring unless there is sufficient time and sufficient oxygen. Such decomposition (pyrolysis) produces products which may be more toxic than the original fuel and the elimination of the possibility of such pyrolysis products in the exhaust may be achieved by insuring as complete combustion as possible with the invention hereinbefore described.

Although but one embodiment of the present invention has been illustrated and described, it will be apparent to those skilled in the art that various changes and modifications may be made therein without departing from the spirit of the invention.

Having thus described our invention what we claim is:

1. A generator for producing superheated fuel gas for an internal combustion engine having an intake manifold, comprising, a vertical closed pressure vessel having a horizontal wall dividing said vessel into upper and lower chambers, electric resistance heating means in said lower chamber, means for energizing said heating means to generate and maintain temperatures between 600° and 1800° F therein, separate means for simultaneously continuously injecting predetermined amounts of gasoline and water into said lower chamber against said heating means so as to simultaneously change said gasoline to a gas and said water to steam, means for controlling the energization of said heating means and the amounts of water and gasoline injected for maintaining a desirable working pressure and volume of the superheated fuel gas in said lower chamber, whereby the molecules of the super heated fuel gas in its heated pressurized gaseous condition are caused to be spaced apart a sufficient degree of support substantially complete combustion in said engine, a pressure responsive device comprising a valve element in said lower chamber movable into and out of an opening located in said wall, a diaphragm in said upper chamber, an arm on said valve element attached to said diaphragm for movement of said valve element thereby, said valve element being arranged to move into and restrict said opening upon an increase in gas pressure in said upper chamber moving said diaphragm away from said opening and to move out of said opening upon a reduction in gas pressure in said upper chamber moving said diaphragm toward said opening, means located between said diaphragm and said wall balancing said diaphragm and said valve element so as to permit said diaphragm to move responsive to pressure changes in said upper chamber, and an outlet in said upper chamber located between said diaphragm and said wall in communication with said inlet manifold.

2. The generator according to claim 1, wherein the engine has an exhaust manifold, and wherein another horizontal wall is located in said pressure vessel defining therein a heating chamber below said lower chamber in communication with said exhaust manifold thereby forming another heating means.

* * * * *